(12) United States Patent
Zaman

(10) Patent No.: US 11,440,666 B2
(45) Date of Patent: Sep. 13, 2022

(54) INTELLIGENT AIRCRAFT SEAT BELT SYSTEM AND METHOD

(71) Applicant: The Boeing Company, Chicago, IL (US)

(72) Inventor: Sk Sahariyaz Zaman, Bangalore (IN)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 16/889,988

(22) Filed: Jun. 2, 2020

(65) Prior Publication Data
US 2021/0371115 A1 Dec. 2, 2021

(51) Int. Cl.
| B60C 23/02 | (2006.01) |
| B60Q 1/00 | (2006.01) |
| B64D 25/06 | (2006.01) |
| G08B 21/22 | (2006.01) |
| B60R 22/48 | (2006.01) |

(52) U.S. Cl.
CPC ............ *B64D 25/06* (2013.01); *G08B 21/22* (2013.01); *B60R 2022/4816* (2013.01)

(58) Field of Classification Search
CPC .............. B64D 25/06; G08B 21/22; B60R 2022/4816; B60R 21/01544; B60R 21/01546; B60R 21/01552; B60R 21/01554
See application file for complete search history.

(56) References Cited

U.S. PATENT DOCUMENTS

| 6,998,988 | B1* | 2/2006 | Kalce | B60N 2/002 340/457.1 |
| 7,012,533 | B2* | 3/2006 | Younse | G08B 21/22 701/45 |
| 7,170,401 | B1* | 1/2007 | Cole | B60R 25/10 340/439 |
| 8,063,788 | B1* | 11/2011 | Morningstar | B60N 2/28 340/439 |
| 8,427,294 | B2 | 4/2013 | Cheung | |
| 10,055,563 | B2 | 8/2018 | Huang et al. | |
| 10,131,318 | B2* | 11/2018 | Davis | B60R 22/48 |
| 10,464,678 | B2* | 11/2019 | Brunaux | B60R 22/48 |
| 2005/0067816 | A1* | 3/2005 | Buckman | A61B 5/6805 280/730.1 |
| 2006/0180764 | A1* | 8/2006 | Yajima | B60R 21/0154 250/349 |
| 2009/0093932 | A1* | 4/2009 | McCall | B60R 22/48 701/45 |
| 2009/0177357 | A1* | 7/2009 | Long | B60R 22/48 701/45 |
| 2010/0253498 | A1* | 10/2010 | Rork | B60N 2/002 340/457.1 |

(Continued)

FOREIGN PATENT DOCUMENTS

EP 2189372 B1 6/2012

*Primary Examiner* — Hai Phan
*Assistant Examiner* — Son M Tang
(74) *Attorney, Agent, or Firm* — Coats & Bennett, PLLC

(57) ABSTRACT

Seat belts, seat belt assemblies, seat belt systems, and methods for incorporating the seat belts, seat belt assemblies, and seat belt assembly systems are disclosed, with the seat belt including a seat belt locking mechanism sensor that, in tandem with a seat belt thermal sensor provides confirmatory information as to a definitive locking condition or locking state of a seat belt.

20 Claims, 7 Drawing Sheets

(56) References Cited

U.S. PATENT DOCUMENTS

| | | | |
|---|---|---|---|
| 2010/0283593 A1* | 11/2010 | Miller | G08B 5/36 |
| | | | 340/447 |
| 2015/0265200 A1* | 9/2015 | Mahdi | B60R 22/48 |
| | | | 600/301 |
| 2015/0379782 A1* | 12/2015 | Nakagawa | G07B 15/063 |
| | | | 705/13 |
| 2017/0208874 A1* | 7/2017 | Davenport | A41D 13/018 |
| 2017/0247015 A1* | 8/2017 | Davis | G08B 21/0283 |
| 2018/0120245 A1* | 5/2018 | Dill | G01N 25/18 |
| 2019/0122036 A1* | 4/2019 | Ward | G06K 9/00342 |
| 2019/0179286 A1* | 6/2019 | Horseman | A41F 9/002 |
| 2020/0017068 A1* | 1/2020 | Moffa | G07C 5/02 |
| 2021/0235787 A1* | 8/2021 | Jeandupeux | A61B 5/01 |
| 2022/0080860 A1* | 3/2022 | Kupietz | B60R 16/0207 |

\* cited by examiner

INTELLIGENT AIRCRAFT SEAT BELT SYSTEM AND METHOD

TECHNOLOGICAL FIELD

The present disclosure relates generally to the field of seat belts for passenger vehicles. More specifically the present disclosure relates to the field of passenger safety and compliance with respect to placing a seat belt into an engaged or locked position upon command.

BACKGROUND

Safety, including passenger safety, is important for any aircraft. The "Fasten Seat Belts" command is one component of the passenger safety. Various regulations (e.g., Commission regulation (EC) No. 859/2008 for the EU; Regulation 14 CFR § 91.107 for the US) determine the seat belt requirements for passenger aircraft. It is mandatory to fasten seat belts during taxi, takeoff and landing, and whenever further deemed necessary in the interest of safety.

Cabin crew members typically ensure this mandatory regulation safety check manually by going to each and every passenger seat. On occasion, the manual safety check by crew members does not affirmatively appreciate the locked or unlocked state of a passenger seat belt.

Known solutions to the problem of ensuring compliance with a "Fasten Seat Belts" command have incorporated RFID chips to deliver a signal when a locking mechanism has been successfully or unsuccessfully accomplished in a seat belt assembly. However, merely determining that a seat belt assembly has been locked does not ensure that a seat belt assembly has been locked around the torso (e.g., waist, etc.) of a user, by a user. That is, the "locking requirement" of a seat belt assembly can be satisfied by a passenger engaging the assembly, while also circumventing the safety aspect of the seat belt by not actually wearing the seat belt. That is, a user/passenger may lock the seat belt assembly, generate a signal that the seat belt assembly is locked, but then, for example, sit upon the locked assembly.

SUMMARY

According to present aspects, the present disclosure is directed to an apparatus, with the apparatus including a seat belt, with the said seat belt including a seat belt receiving end first side, a seat belt receiving end second side, a seat belt locking sensor, and a thermal sensor.

In another aspect, the thermal sensor is configured to sense at least one of: a seat belt receiving end first side temperature and a seat belt receiving end second side temperature.

In another aspect, the thermal sensor senses a temperature difference between the seat belt receiving end first side temperature and the seat belt receiving end second side temperature.

In a further aspect, when the seat belt is worn by a user, the seat belt receiving end first side temperature is approximately equal to an ambient temperature and the seat belt receiving end second side temperature is approximately equal to a user torso temperature.

In another aspect, the thermal sensor comprises a thermal sensor transmitter, said thermal sensor transmitter configured to transmit a thermal sensor signal, said thermal sensor signal relating to the temperature of at least one predetermined area of the seat belt receiving end.

Another aspect is directed to a passenger seat including a seat belt, with the said seat belt including a seat belt first side, a seat belt second side, a seat belt locking mechanism, and a thermal sensor.

A further aspect is directed to a vehicle having a passenger seat, with the passenger seat including a seat belt, with the said seat belt including a seat belt first side, a seat belt second side, a seat belt locking mechanism, and a thermal sensor.

In another aspect, the vehicle is an aircraft.

Further aspects are directed to a system for monitoring/confirming the current state of seat belt fastening compliance of passengers proximate to a seat belt, with the system including a seat belt assembly, and with the seat belt assembly including a seat belt insertion end, with the seat belt insertion end, and with the seat belt insertion end in communication with a first strap. The system further includes a seat belt receiving end, with the seat belt receiving end including a seat belt receiving end first side and a seat belt receiving end second side. The seat belt receiving end is further in communication with a second strap, with the seat belt receiving end dimensioned to receive the seat belt insertion end. The seat belt receiving end includes a seat belt fastening mechanism (equivalently referred tom herein as a "seat belt locking mechanism"). The seat belt locking mechanism is configured to lock and unlock the seat belt insertion end with the seat belt receiving end. The seat belt locking mechanism includes a locking mechanism transmitter in communication with the locking mechanism. The seat belt receiving end further includes a thermal sensor oriented on at least one of the seat belt receiving end first side and the seat belt receiving end second side. The thermal sensor includes a thermal sensor transmitter, and the system further includes a thermal sensor signal receiver configured to receive a signal from the thermal sensor transmitter.

In another aspect, the system further includes a receiver configured to receive a signal from the locking mechanism transmitter, wherein the receiver is a thermal sensor receiver.

In another aspect, the thermal sensor is configured to sense a seat belt receiving end first side temperature and a seat belt receiving side second side temperature.

In a further aspect, the thermal sensor senses a temperature difference between the seat belt receiving end first side temperature and the seat belt receiving end second side temperature.

In another aspect, the thermal sensor comprises a thermal sensor transmitter, said thermal sensor transmitter configured to transmit a thermal sensor signal, with the thermal sensor signal conveying information regarding or information otherwise related to a sensed temperature of at least one predetermined area of the seat belt assembly.

In another aspect, a passenger seat includes the presently disclosed seat belt, and/or seat belt assembly, and/or seat belt systems.

In a further aspect, a vehicle, that can be a passenger aircraft, includes the presently disclosed seat belt, and/or seat belt assembly and/or seat belt systems.

Another aspect is directed to a method for ensuring seat belt fastening has occurred, with the method including confirming a locking state of a seat belt assembly, and confirming a thermal reading from a thermal sensor in a seat belt assembly.

In another aspect, the method further includes providing a seat belt assembly, with the seat belt assembly including a seat belt insertion end, said seat belt insertion end in communication with a first strap. The seat belt assembly further includes a seat belt receiving end, with the seat belt receiving end in communication with a second strap, with the seat belt receiving end including a seat belt receiving end first side and a seat belt receiving end second side, with the seat belt receiving end dimensioned to receive the seat belt insertion end. The seat belt assembly further includes a seat belt fastening mechanism that includes a seat belt locking mechanism, with the locking mechanism configured to lock the seat belt insertion end with the seat belt receiving end, and with the locking mechanism including a locking mechanism transmitter in communication with the locking mechanism. The locking mechanism transmitter is configured to transmit a signal indicating the state of the locking mechanism. The seat belt assembly further includes a thermal sensor oriented on at least one of the receiving end second side and the insertion end second side, with the thermal sensor comprising a thermal sensor transmitter.

In a further aspect, a method further includes providing a first receiver configured to receive a signal from the locking mechanism transmitter, with the first receiver further configured to receive a signal from the thermal sensor transmitter, with the first receiver further configured to receive a signal from the thermal sensor transmitter.

In another aspect, a method includes providing a first receiver configured to receive a signal from the locking mechanism transmitter, with the first receiver further configured to receive a signal from the thermal sensor transmitter, and providing a second receiver, with the second receiver configured to receive a signal from a thermal sensor transmitter.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
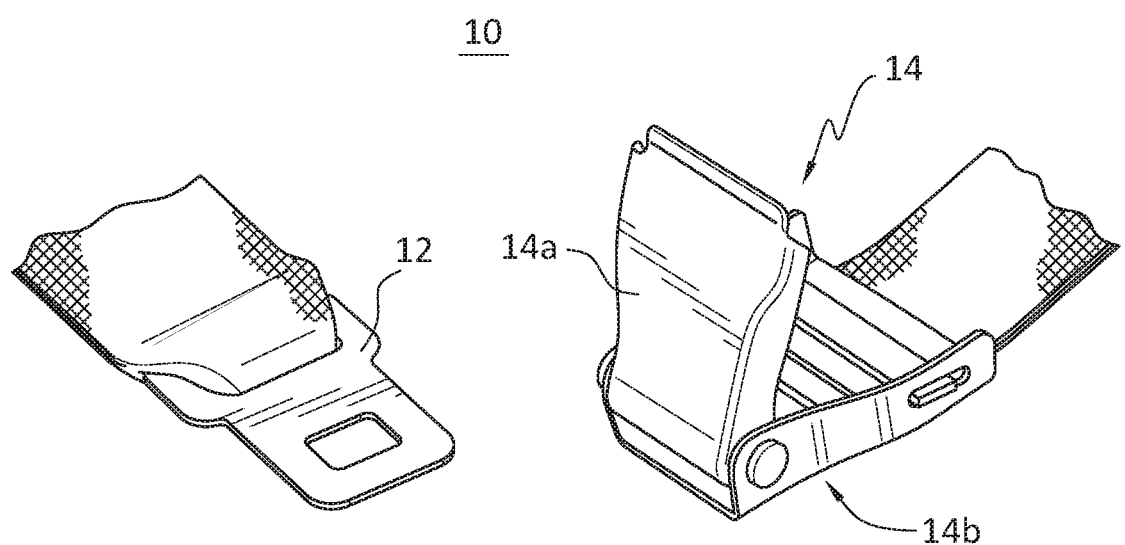
Figure 2:
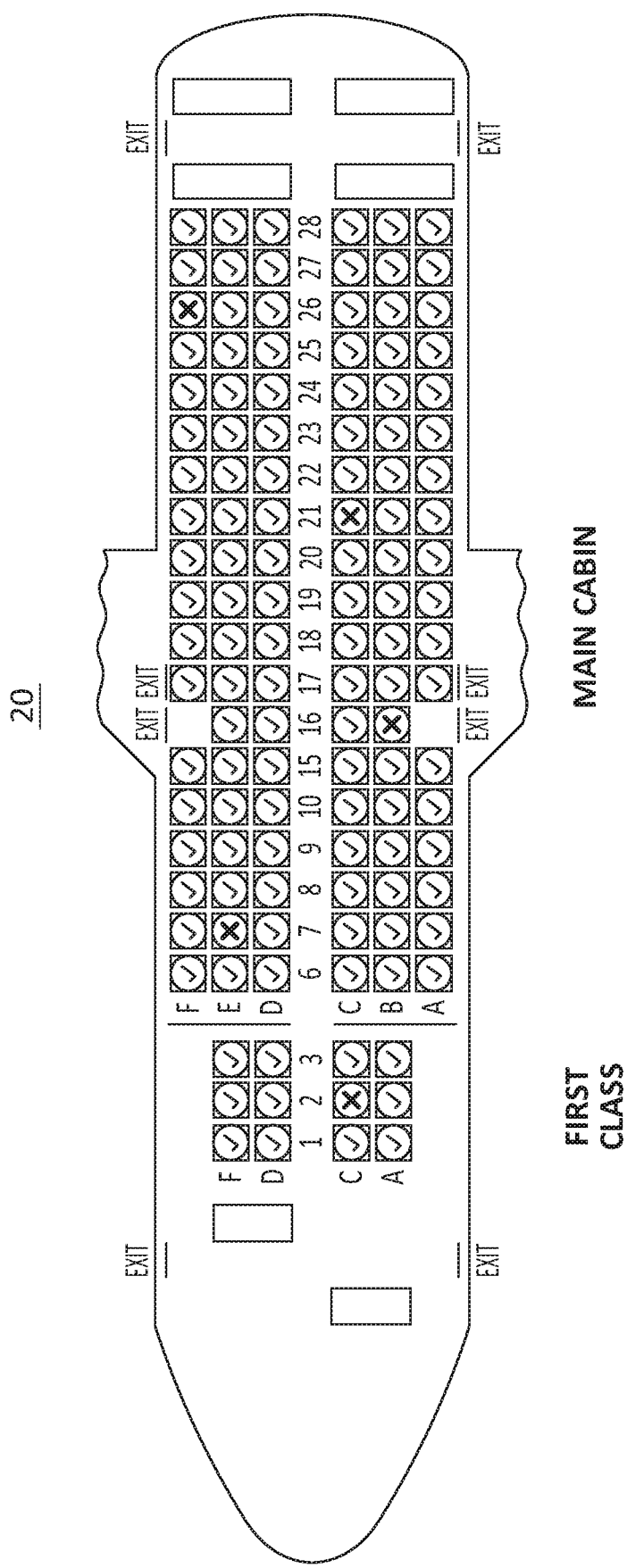
Figure 3:
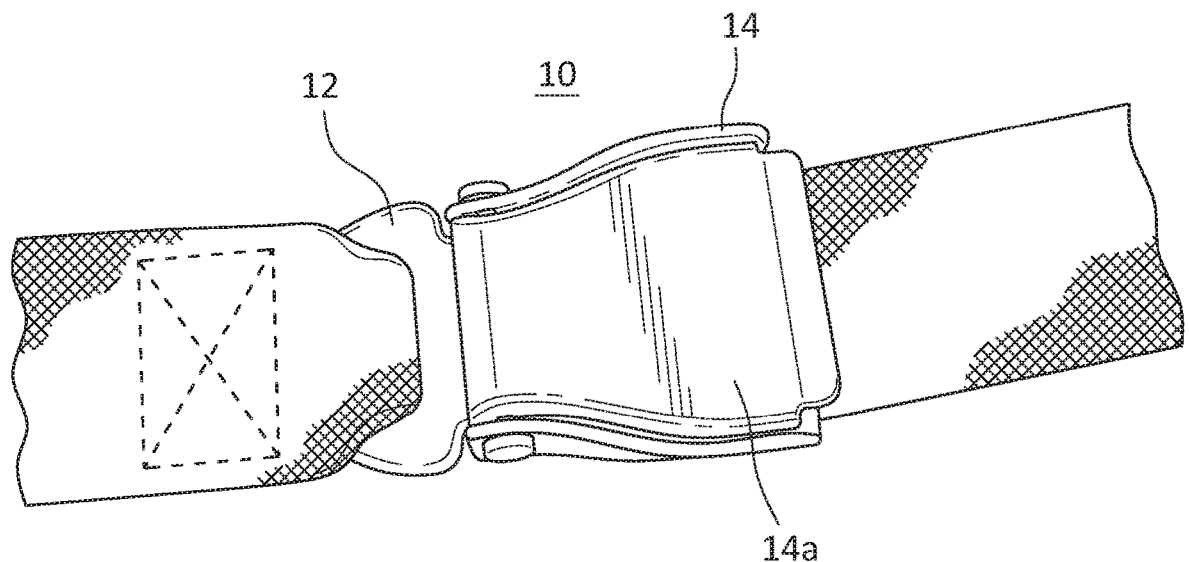
Figure 4:
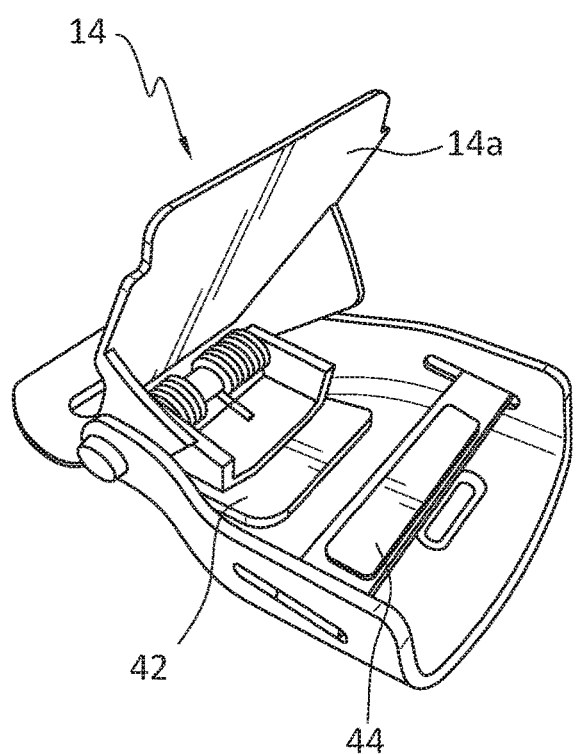
Figure 5:
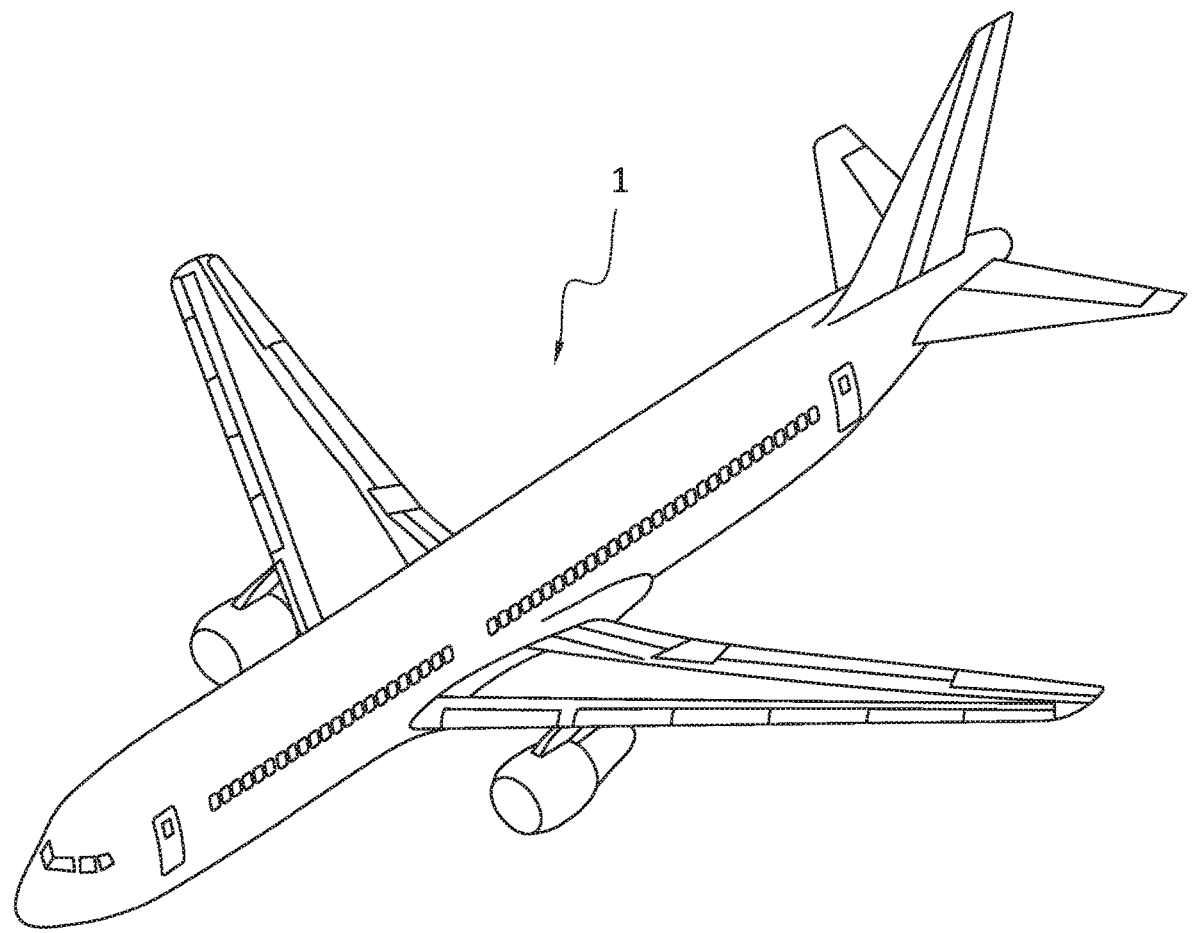
Figure 6:
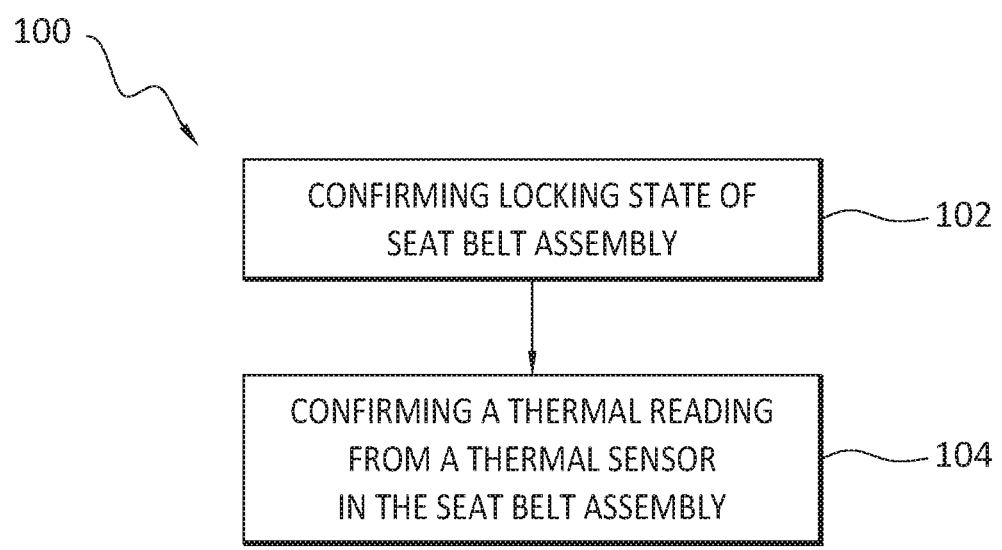
Figure 7:
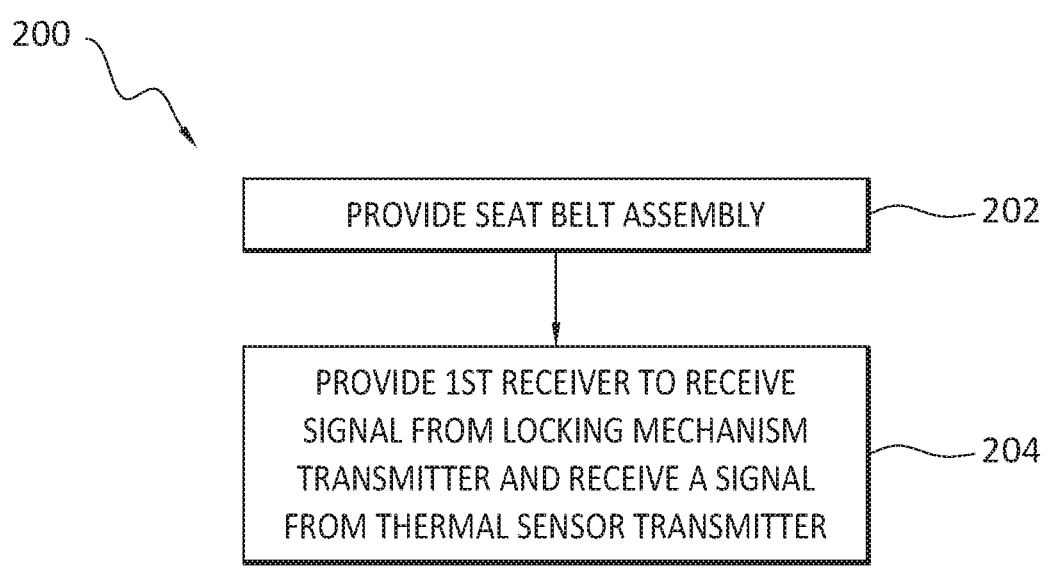

Having thus described variations of the disclosure in general terms, reference will now be made to the accompanying drawings, which are not necessarily drawn to scale, and wherein:

FIG. 1 is an illustration of a seat belt assembly in an unlocked configuration according to a present aspect;

FIG. 2 is an illustration of a seating display according to a present aspect;

FIG. 3 is an illustration of a seat belt assembly in a locked configuration according to a present aspect;

FIG. 4 is an illustration of an exposed view of a seat belt assembly receiving end according to a present aspect;

FIG. 5 is an illustration of a vehicle in the form of an aircraft that includes the seat belt assembly, according to a present aspect;

FIG. 6 is a flowchart illustrating a method according to a present aspect;

FIG. 7 is a flowchart illustrating a method according to a present aspect; and

Figure 8:
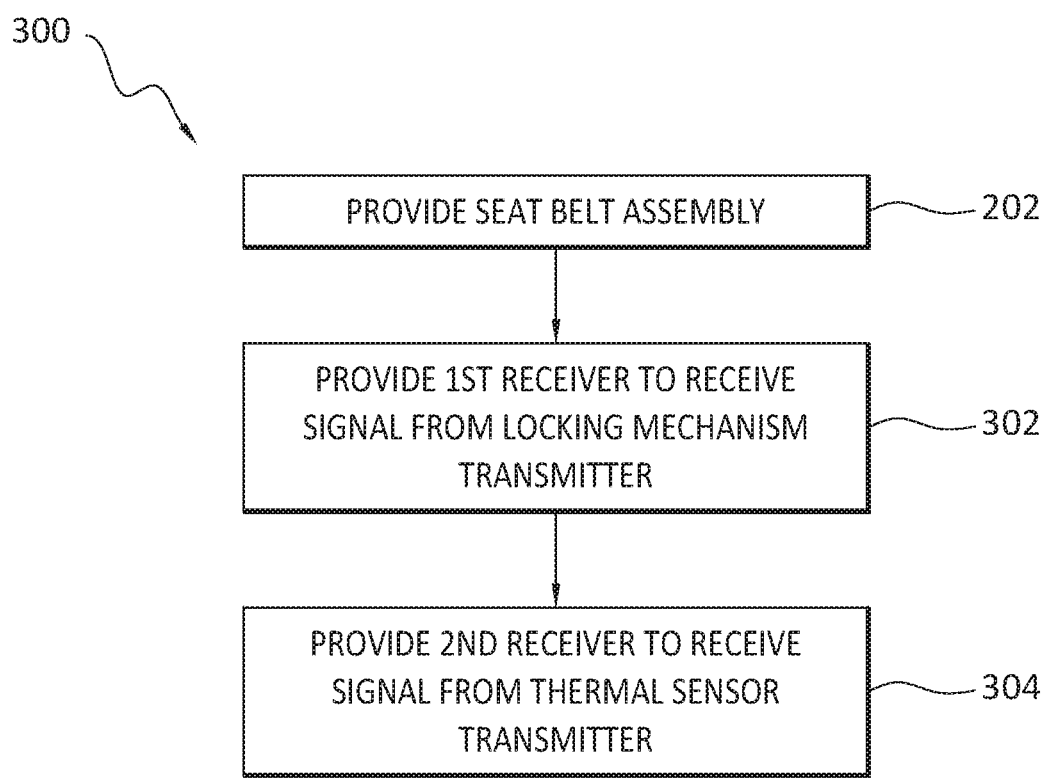

FIG. 8 is a flowchart illustrating a method according to a present aspect.

DETAILED DESCRIPTION

Present aspects include employing an "Internet of Things (IOT)-based" technology incorporated into a seat belt assembly (e.g., to form a "smart" seat belt assembly), that will help the commander/pilot and crew members of a passenger vehicle (e.g., a passenger aircraft, etc.) ensure that all passengers affirmatively comply completely with the "Fasten seal be/s" command that is mandated by regulations for safety. According to present aspects, the disclosed smart seat belt assembly includes a magnetic-based or switch-based sensor to ensure the locking condition of the seat belt lock as properly "locked" (e.g., securely engaged) or "unlocked" (e.g., disengaged). The smart seat belt assembly also incorporates a thermal sensor that can sense a thermal condition (e.g., human body heat equivalently referred to herein as "a thermal signature") from, for example, a human torso, etc., to ensure that a passenger actually wears the belt properly, instead of just locking the belt (without wearing the belt properly).

Attached illustrations show the non-limiting designs of the smart seat belt and seat belt assembly. FIG. 1 shows a seat belt assembly 10 in an unlocked and disengaged state, with the seat belt assembly including a seat belt insertion end 12 (referred to equivalently herein as the "seat belt male end") and a seat belt receiving end 14 (referred to equivalently herein as "seat belt female end"). Seat belt receiving end 14 includes a seat belt receiving end first side 14a and a seat belt receiving end second side 14b. FIG. 1 shows the seat belt assembly 10 in an unlocked condition or unlocked state (referred to equivalently as a "disengaged condition" or "disengaged state"). FIG. 3 shows the seat belt assembly 10 of the type shown in FIG. 1, and now shown in a locked condition or locked state (referred to equivalently herein as an "engaged condition" or "engaged state"). According to present aspects, the seat belts and seat belt assemblies can be of the type used on a passenger seat of a vehicle including, for example, a passenger aircraft of the type shown as vehicle 1 in the form of an aircraft, as illustrated in FIG. 5.

According to present aspects, FIG. 2 is a non-limiting illustration of an exemplary readout display 20 that can be provided to a flight attendant or a flight officer to evidence that safety regulations have been complied with (e.g., relative to mandated seat belt engagement policy and safety regulations, etc.) at any given time pre-flight, during flight, post-flight, and that can be delivered in substantially real time. For example, sensor data can be collected wirelessly (e.g., using LE Bluetooth, NFC, ZigBee, RFID, Wi-Fi, etc.) or sensor data can be communicated via a wired connection, with the sensor data in the form of, for example, signals sent from a sensor transmitter to a receiver, etc.

According to present aspects, cabin crew members or flight officers, for example, can view, inspect, confirm, etc., the collected and displayed smart seat belt confirmatory information for all passengers at a single glance to ensure safety norms at the time of taxi, take-off, landing, or on demand as necessary, etc. That is, the present systems, apparatuses, and methods help cabin crew members to quickly and efficiently identify (e.g., from a crew member workstation), the passengers (based on smart belt unique number/seat number, etc.) that have not complied with safety norm without visiting and visually inspecting each and every passenger for the purpose of confirming a properly secured seat belt.

For example, according to present aspects, the disclosed seat belts, seat belt assemblies, and seat belt systems (e.g., as shown in FIG. 2, etc.) conclusively evidence the locking condition or locking state (e.g., "locked" or "unlocked" AND "worn correctly" or "not worn correctly", etc.) in real time. For example, the readout display 20 shown in FIG. 2 would quickly alert a crew member or pilot at a glance and in real time, as indicated, for example, by an "X", that passengers occupying seats 2C, 7E, 16B, 21C and 26F had not fastened their seat belts. In addition to ensuring safety regulation compliance, the presently disclosed systems, apparatuses, and methods will save boarding and inspection time, assist in on time departure and takeoff, increase efficiency, decrease fuel cost during idling, and save overall operational cost.

According to further aspects, FIG. 4 shows the seat belt receiving end 14 in an open orientation and showing the exposed locking mechanism sensor 42 and the thermal sensor 44. Though not shown in FIG. 4, the thermal sensor can sense temperatures from a plurality of locations in the seat belt receiving end. That is, thermal sensor 44 can substantially simultaneously detect the temperature of the seat belt receiving end second side 14b and the temperature of the seat belt receiving end first side 14a. In this way, the thermal sensor can detect, record, and transmit temperature information to a receiver.

When the seat belt is properly worn by a user, the locking mechanism sensor 42 will detect the proper engagement of the locking mechanism, and the locking mechanism sensor 42 (that includes a locking mechanism transmitter not shown in FIG. 4) can transmit a confirmatory signal to a receiver (e.g. a receiver in communication with an aircraft databus, or in communication with a controller configured to collect information and then provide collected information to a readout, etc., such as a readout display of the type shown in FIG. 2, etc.) confirming that a proper "locking" condition or engagement condition of the seat belt assembly has occurred for a specific seat belt assembly (e.g., a specific seat belt assembly located at and associated with a particular seat location in, for example, a passenger aircraft cabin).

In addition, according to present aspects, substantially simultaneously with the information regarding the locking mechanism and the locking condition, the thermal sensor 44 transmits information regarding the real time temperature of the seat belt receiving end second side (e.g., the side of the seat belt receiving end that would be resting, or otherwise brought into contact with the torso of the body of a passenger wearing the seat belt, etc.). The thermal sensor that is incorporated into the presently disclosed seat belts and seat belt assemblies conclusively determines a locking condition of a seat belt assembly, and further ensures that the seat belt is actually being worn properly by a user/passenger (e.g., as opposed to a seat belt assembly has merely been engaged into a locking position—thus satisfying the locking function of the seat belt assembly, but that is not actually being worn by a user/passenger and, instead, for example, is locked, but is merely being "sat upon" by the user/passenger).

In addition, according to further aspects, to conclusively determine a locking condition of a seat belt assembly (e.g., that the seat belt assembly has not merely been engaged into a locking position—thus satisfying the locking function of the seat belt assembly) and to ensure that an otherwise "locked" or engaged seat belt assembly is merely being "sat upon" by the user (potentially satisfying a heat signature adequate to satisfy a temperature approximately equal to a human body torso), the thermal sensor senses, records, and transmits information regarding the temperature of both the seat belt receiving end second side and the temperature of the seat belt receiving end first side (e.g., the side of the seat belt receiving end that, when worn properly would be exposed to an ambient surrounding). By also sensing the temperature of the seat belt receiving end first side, when the seat belt is being worn properly, the thermal sensor senses a temperature difference between the seat belt receiving end second side (that has a temperature that is approximately equivalent to temperature of a human torso) and seat belt receiving end first side (that has a temperature that is approximately equal to an ambient cabin temperature).

According to one aspect, when the thermal sensor detects a temperature differential between various monitored and predetermined locations on the seat belt receiving end, a confirmatory signal can be transmitted from a thermal sensor transmitter to a receiver (e.g. a receiver in communication with an aircraft databus, or in communication with a controller configured to collect information and then provide collected information to a readout, etc.) confirming that a proper "locking" of the seat belt assembly has occurred (e.g., a specific seat belt assembly located at and associated with a particular seat location in, for example, a passenger aircraft cabin such as those shown in the readout display shown in FIG. 2).

According to present aspects, the thermal sensor confirmation in combination with the locking mechanism confirmation ensures that a seat belt assembly at a specified location has been properly locked, and that the passenger wearing such seat belt assembly has complied with the "Fasten, Seat Belts" command.

FIG. 6 is a flowchart illustrating a method 100 according to present aspects including confirming 102 the locking state or locking condition of a seat belt assembly for example, via a confirmatory locking condition signal sent from a seat belt locking sensor and received by a receiver. The method 100 further includes confirming 104 a thermal condition in the form of, for example, a thermal reading sensed by and sent by a seat belt thermal sensor and received by a receiver. The method 100 can incorporate the seat belt, seat belt assemblies and systems set forth in FIGS. 1-5.

In another aspect, FIG. 7 is a flowchart illustrating a method 200 including providing 202 a seat belt assembly and providing 204 a first receiver to receive a signal sent from a seat belt locking mechanism transmitter and receive a signal sent from a seat belt thermal sensor transmitter. The method 200 can incorporate the seat belt, seat belt assemblies and systems set forth in FIGS. 1-5 and can further incorporate the method as shown in FIG. 6.

In another aspect, FIG. 8 is a flowchart illustrating a method 300 including providing 202 a seat belt assembly and providing 302 a first receiver to receive a signal sent from a seat belt locking mechanism transmitter and providing 304 a second receiver to receive a signal sent from a seat belt thermal sensor. The method 300 can incorporate the seat belt, seat belt assemblies and systems set forth in FIGS. 1-5 and can further incorporate the methods as shown in FIGS. 6 and 7.

Presently disclosed seat belts, seat belt assemblies, and systems incorporating the seat belts and seat belt assemblies can be included in vehicles designed to convey passengers, with the vehicles including, for example, vehicles, etc., including, for example, manned and unmanned aircraft, manned and unmanned spacecraft, manned and unmanned rotorcraft, manned and unmanned hovercraft, manned and unmanned terrestrial vehicles, manned and unmanned waterborne surface vehicles, manned and unmanned waterborne sub-surface vehicles, manned and unmanned satellites, and the like, and combinations thereof.

The present aspects can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus comprising:
a vehicle seat belt assembly for a vehicle seat, said vehicle seat belt assembly configured to attach to a vehicle seat, said vehicle seat belt assembly comprising:
  a seat belt insertion end, said seat belt insertion end in communication with a first strap, said first strap configured to attach to a vehicle seat;
  a seat belt receiving end, said seat belt receiving end in communication with a second strap, said second strap configured to attach to the vehicle seat, said seat belt receiving end comprising:
    a seat belt receiving end first side;
    a seat belt receiving end second side that is pivotally connected to the seat belt receiving end first side, the seat belt receiving end first and second sides movable between an open orientation to release from the seat belt insertion end and a closed orientation to engage with the seat belt insertion end;
    a seat belt locking sensor;
    a thermal sensor mounted to the seat belt receiving end and positioned in proximity to each of the seat belt receiving end first and second sides in the closed orientation; and
  wherein the seat belt insertion end, the first strap, the seat belt receiving end, and the second strap are configured to form a vehicle seat belt;
  wherein the thermal sensor is positioned between the seat belt receiving end first and second sides to simultaneously sense a seat belt receiving end first side temperature and a seat belt receiving end second side temperature when the seat belt receiving end is in the closed orientation.

2. The apparatus of claim 1, wherein the thermal sensor senses a temperature difference between the seat belt receiving end first side temperature and the seat belt receiving end second side temperature.

3. The apparatus of claim 2, wherein the thermal sensor further comprises a thermal sensor transmitter, said thermal sensor transmitter configured to transmit a thermal sensor signal to a receiver, said thermal sensor signal configured to signal a temperature of at least one predetermined area of the seat belt receiving end.

4. The apparatus of claim 1, wherein, when the vehicle seat belt is worn by a user, the seat belt receiving end first side temperature is approximately equal to an ambient temperature and the seat belt receiving end second side temperature is approximately equal to a user torso temperature.

5. A passenger seat comprising the apparatus of claim 1.

6. A vehicle comprising the apparatus of claim 1.

7. An aircraft comprising the apparatus of claim 1.

8. A system comprising:
a vehicle seat belt comprising;
  a seat belt insertion end, said seat belt insertion end in communication with a first strap, said first strap configured to attach to a vehicle seat;
  a seat belt receiving end, said seat belt receiving end comprising a seat belt receiving end first side and a seat belt receiving end second side that are pivotally connected together and movable between an open orientation and a closed orientation, said seat belt receiving end in communication with a second strap, said second strap configured to attach to the vehicle seat, said seat belt receiving end dimensioned to receive the seat belt insertion end and engage with the seat belt insertion end in the closed orientation;
  a seat belt locking mechanism, said seat belt locking mechanism comprising a seat belt locking mechanism transmitter; and
  a seat belt thermal sensor oriented on at least one of the seat belt receiving end first side and the seat belt receiving end second side and positioned in proximity to each of the seat belt receiving end first and second sides in the closed orientation to sense a first temperature of the seat belt receiving end first side and a second temperature of the seat belt receiving end second side, said seat belt thermal sensor further comprising a seat belt thermal sensor transmitter; and
at least one receiver, said at least one receiver configured to receive a signal from the seat belt locking mechanism transmitter and the seat belt thermal sensor transmitter.

9. The system of claim 8, wherein said at least one receiver comprises:
  a first receiver configured to receive a locking mechanism signal from the seat belt locking mechanism transmitter; and
  a second receiver configured to receive a thermal sensor signal from the seat belt thermal sensor transmitter.

10. The system of claim 8, wherein the seat belt thermal sensor senses a temperature difference between the seat belt receiving end first side temperature and the seat belt receiving end second side temperature.

11. The system of claim 8, wherein, when the vehicle seat belt is worn by a user, the vehicle seat belt receiving end first side temperature is approximately equal to an ambient temperature and the seat belt receiving end second side temperature is approximately equal to a torso temperature of the user.

12. The system of claim 8, wherein the seat belt thermal sensor comprises a seat belt thermal sensor transmitter, said seat belt thermal sensor transmitter configured to transmit a thermal sensor signal, said seat belt thermal sensor signal comprising the temperature of at least one predetermined area of the seat belt.

13. A passenger seat comprising the system of claim 8.

14. A vehicle comprising the system of claim 8.

15. An aircraft comprising the system of claim 8.

16. The apparatus of claim 1, wherein the seat belt receiving end comprises a bar that extends between a first face of the seat belt receiving end first side and a second face of the seat belt receiving end second side with the thermal sensor mounted on the bar.

17. The apparatus of claim 16, wherein the bar is connected to the seat belt receiving end second side, the bar being spaced away from the seat belt receiving end first side in the open orientation.

18. A method comprising:
providing a vehicle seat belt assembly, said seat belt assembly configured to attach to a vehicle seat, said vehicle seat belt assembly comprising:
  a seat belt insertion end, said seat belt insertion end in communication with a first strap;
  a seat belt receiving end, said seat belt receiving end in communication with a second strap, said seat belt receiving end comprising a seat belt receiving end first side and a seat belt receiving end second side, said seat belt receiving end dimensioned to receive the seat belt insertion end;

a seat belt locking mechanism comprising:
a seat belt locking mechanism transmitter; and
a seat belt thermal sensor oriented on at least one of the seat belt receiving end first side and the seat belt receiving end second side, said seat belt thermal sensor positioned between the seat belt receiving end first and second sides to simultaneously sense a temperature of the seat belt receiving end first side and a temperature of said seat belt receiving end second side, said thermal sensor comprising a seat belt thermal sensor transmitter; and
providing a receiver configured to receive a seat belt locking mechanism signal from the seat belt locking mechanism transmitter, and said receiver further configured to receive a thermal sensor signal from the seat belt thermal sensor transmitter.

19. The method of claim 18, further comprising:
providing a seat belt locking mechanism signal receiver configured to receive the seat belt locking mechanism signal from the seat belt locking mechanism transmitter; and providing a thermal sensor signal receiver configured to receive the thermal sensor signal from the seat belt thermal sensor transmitter.

20. The method of claim 18, further comprising:
transmitting the seat belt locking mechanism signal from the locking mechanism transmitter;
receiving at the receiver the seat belt locking mechanism signal to confirm a locking condition of the vehicle seat belt assembly;
transmitting the thermal sensor signal from the thermal sensor transmitter;
receiving at the receiver the thermal sensor signal to confirm a thermal condition of the seat belt assembly; and
wherein the receiver receiving both the seat belt locking mechanism signal and the thermal sensor signal confirms compliance with a mandatory seat belt command.

\* \* \* \* \*